United States Patent
Price et al.

(10) Patent No.: US 8,117,101 B1
(45) Date of Patent: Feb. 14, 2012

(54) DATABASE STRUCTURE FOR A CONSUMER REPORTING AGENCY

(75) Inventors: William H. Price, Johnstown, OH (US); Jonathan H. Price, Columbus, OH (US)

(73) Assignee: Innovis, Inc., Columbus, OH (US)

( * ) Notice: Subject to any disclaimer, the term of this patent is extended or adjusted under 35 U.S.C. 154(b) by 1556 days.

(21) Appl. No.: 10/401,845

(22) Filed: Mar. 28, 2003

(51) Int. Cl.
*G06Q 40/00* (2006.01)
(52) U.S. Cl. .......................... 705/35; 705/38
(58) Field of Classification Search .................. None
See application file for complete search history.

(56) References Cited

U.S. PATENT DOCUMENTS

| | | | |
|---|---|---|---|
| 5,274,547 A * | 12/1993 | Zoffel et al. ................. | 705/38 |
| 5,611,052 A * | 3/1997 | Dykstra et al. ............... | 705/38 |
| 5,878,403 A * | 3/1999 | DeFrancesco et al. ......... | 705/38 |
| 6,144,988 A | 11/2000 | Kappel | |
| 6,263,447 B1 | 7/2001 | French et al. | |
| 6,298,330 B1 | 10/2001 | Gardenswartz et al. | |
| 6,311,169 B2 | 10/2001 | Duhon | |
| 7,403,942 B1 * | 7/2008 | Bayliss .......................... | 707/748 |
| 2001/0037289 A1 * | 11/2001 | Mayr et al. .................... | 705/38 |
| 2002/0007341 A1 * | 1/2002 | Lent et al. .................... | 705/38 |
| 2002/0026411 A1 | 2/2002 | Nathans et al. | |
| 2002/0103749 A1 | 8/2002 | Agudo et al. | |
| 2004/0199456 A1 * | 10/2004 | Flint et al. ...................... | 705/38 |
| 2007/0226093 A1 * | 9/2007 | Chan et al. ..................... | 705/35 |

OTHER PUBLICATIONS

Rehm, Barbara, "Message to Bankers Sharing Client Data: Beware a Backlash, American Banker", Dec. 16, 1996, vol. 161, Iss. 239, p. 4.*
PR Newswire, "Major Credit Grantors Fight Application Fraud With Detect From Experian; Application Fraud Prevention System Integrated Into Processing Systems", Jan. 16, 2002, p. 1.*
McGill, Adrienne, "Make sure your not unfairly; blacklisted; [Ulster Edition]", The Belfast News Letter, Jun. 2, 1998, p. 27.*

* cited by examiner

*Primary Examiner* — Alexander Kalinowski
*Assistant Examiner* — John Scarito
(74) *Attorney, Agent, or Firm* — Roger N. Chauza, P.C.

(57) ABSTRACT

A database used by a consumer reporting agency for storing application information data in association with transaction and experience information. A consumer applying for credit submits personal and financial information either verbally or by filling out a form. The application information data submitted verbally or by a form is submitted by an institution along with a request for a credit report on the consumer. The consumer reporting agency receives the request and stores the application information separately from the transaction and experience information. Each time an institution submits application information data related to the consumer, the data is accumulated in successive records and maintained. In response to a request for a report on a consumer, the consumer reporting agency forwards a response based on the application records accumulated.

18 Claims, 5 Drawing Sheets

TABLE 2 /24

Consumer Identification -1
    Application Data - submitted on 5/28/2002 by Sears
    Application Data - submitted on 5/20/2002 by J.C. Penneys
    Application Data - submitted on 2/15/2002 by Foley's
    Application Data - submitted on 2/14/2002 by Foley's
$34_1$, $34_2$, $34_3$, $34_i$
    ⋮
    Application Data - submitted on 10/14/1999 by K-Mart
    ⋮

Consumer Identification - m
    Application Data - submitted on 1/27/2001 by Target
    ⋮
    Application Data - submitted on 3/18/2000 by Sears

DATABASE STRUCTURE FOR A CONSUMER REPORTING AGENCY

RELATED APPLICATION

This patent application relates to U.S. patent application entitled "Consumer Credit Data Storage System", by Eric M. Duhon, Ser. No. 09/957,214, filed Sep. 19, 2001.

TECHNICAL FIELD OF THE INVENTION

The present invention relates in general to the building of consumer reporting databases, and more particularly relates to techniques for storing consumer credit and application information, and for retrieval thereof.

BACKGROUND OF THE INVENTION

A substantial percentage of personal and business financial transactions are carried out by the use of credit. When one has established an acceptable line of credit, the use of credit to finance a transaction is a rudimentary procedure. However, in order to grant a person or business credit, a number of factors must be found to be acceptable. These factors are generally gleaned from an accumulation of information about the consumer desiring to establish credit. A database of the accumulated consumer credit information has historically been maintained by the consumer credit reporting industry.

An example of the chain of events that occurs in obtaining credit sufficient for paying for goods and services is as follows. A consumer seeking to establish credit with an institution, such as a retail store, fills out an application for credit. Application forms generally request that the consumer provide all types of personal and historical information concerning his/her finances, employment history, and other information unique to the person. The institution then uses the personal identifying information from the application form and makes a request with a consumer reporting agency to provide a credit report on file for the consumer, if such a file exists. The consumer credit information stored by the consumer reporting agency in relation to the consumer is transferred to the institution for analysis to determine if the consumer is worthy of credit. If the consumer does not have credit considered to be sufficient, then the consumer is denied credit by the institution. On the other hand, if the consumer has a history of sufficiently good credit, then credit may be extended by the institution.

Computer automation in the consumer credit reporting industry began in the 1960's and continued to expand within the industry in the 1970's. This change to the automation or computerization of consumer records and the procedure in the consumer credit reporting industry revolutionized the way information was gathered, processed, and accessed, not only by the consumer reporting agencies, but also by the institutions that purchased the consumer reports and related services.

Prior to this time of automation, the activities of building, maintaining and providing consumer credit information was a manual and labor intensive process. Many of the records were of the paper or documentary form, and thus the generating, updating and correction of the same was an onerous task. Even the early computerized systems were very limited in speed, storage capacity and the number of requests that could be processed per unit of time. As the credit reporting industry evolved, the procedures for obtaining consumer credit information has become more complicated, as has the type and amount of information available. In addition, many safeguards must be built into the consumer reporting database to assure that the data is not only accurate, but that the consumer credit information is provided only to the appropriate institutions or individuals. The fraudulent procurement by one party of another's credit information can lead to substantial monetary losses, as well as damage to the other party's credit.

Building a consumer reporting database required multiple processes to be executed in order to achieve the basic goal of establishing a "file" for each credit active consumer, and to periodically add existing credit account information for each consumer to the consumer's file. One process that was employed to build a consumer reporting database was the solicitation of past and current credit account information from institutions. With each credit account reported by the institution to the consumer reporting agency, either the newly-reported credit account would be added to the database file of an existing consumer, or the newly-reported credit account would be used to build a new file for a consumer who did not previously have a database file.

Another process in building a consumer reporting information database was the gathering of public record data from courthouses. Each segment of a public record associated with consumer credit information would be either added to an existing consumer's file, or would be used to establish a new file when that consumer did not previously have a database file.

As the computer automation of records and procedures began to grow in the consumer credit reporting industry, the basic goals for building a consumer information database remained, but many of the methods changed. Institutions began reporting credit account information by way of computer tapes. Consumer reporting agencies would process the tapes and either add the credit account information to an existing consumer's file in the computerized consumer information database, or created a new file for that consumer if no file previously existed in the computerized consumer information database.

The method for requesting and receiving consumer information from institutions also changed dramatically. Prior to computer automation, the exchange of consumer credit information between the consumer credit reporting industry and the institutions took place verbally by way of telephone conversations. After computer automation, the institutions began to electronically access consumer reports with computer terminals. The computerized consumer reporting systems employed programs that permitted the institutions to data enter information uniquely identifying the consumer. This unique information obtained from a credit application filled out by the consumer was entered into the computer terminal to request and receive a credit report associated with the consumer applying for credit. These computer programs limited the amount of application information that could be provided by the institution in the request for a consumer report. The application information was generally limited to personal identification, such as name, address, date of birth, social security number, telephone number and employment information.

More recently, consumer reports are purchased electronically, but the vast majority are not accessed from computer terminals operated by the computerized consumer reporting systems. Institutions purchasing consumer reports frequently data enter all of the information on the applications into their own computerized application processing systems. The use of such application information is for internal purposes of the institution, and is not reported or made available to consumer reporting agencies.

These computerized application processing systems of the institutions are adapted for electronically transmitting requests to the computerized consumer credit reporting systems for obtaining consumer reports. While the application information is available and accessible by the institution in its computerized application processing systems, only limited information that personally identifies the consumer, and his or her employment information, is transmitted to and integrated into the database of the computerized consumer credit reporting systems.

Application information is personal data about a person consisting of, but not limited to, information such as name, address, phone number, place of employment, marital status, number of dependents, and income. Other types of application information may include additional personal data related to assets, liabilities, personal property, debt, and other contacts the person may have.

Application information is provided to institutions by persons seeking something of value. Institutions use the application information as one of the tools in making positive identification of the person to whom the institution is providing something of value.

However, there are situations that occur where a person's identity information is stolen and used by other persons for fraudulent purposes in order to gain material wealth for themselves.

Identity theft has become one of the fastest growing crimes across the country, according to many law enforcement agencies. In the course of a day, persons fill out applications for home loans, cell phones, credit cards, apartment leases, and a host of other things, so that they can enjoy both the necessities and the luxuries of life. Many do not realize how much personal information is passed on to total strangers who may use and abuse it for their personal gain, that is, steal someone's personal identity information to secure goods and services for themselves and, perhaps, sell the ID to others for their personal gain.

Identity theft started with thieves trying to steal "wallet-type" information, i.e., name, address, social security number, credit cards and more. The thief would use the information to contact a person's credit card issuer and change the mailing address so that charges could be run up and the bills would be sent to a new address and never paid until months had passed and thousands of dollars had been charged to the credit card.

Identity thieves obtain personal information in several other ways also: from trash dumpsters, by posing as someone they are not to get information, by illegally obtaining credit reports on persons, and by buying information from "inside" sources.

Identity protection systems worked to try and provide security for victims whose ID was stolen by using picture IDs and some forms of electronic verification, but it was not enough, as thieves continued to find ways to steal the basic identification information. As a result, persons who have their identities stolen spend months or years, and thousands of dollars, cleaning up the problems created by identity thieves, not to mention the embarrassing phone calls and letters they receive from collectors telling them they owe money and that they are seriously past due.

The effects of identity theft are felt in virtually every industry in the business world-banking, telecommunications, computers, and many others. There is a very large need for a method that would provide even greater protection for both persons and the institutions with which the persons conduct business. One such method would compare application information from a person seeking something of value from an institution, to a database containing application information compiled and stored from other institutions in order to test the validity of new application information. This technique would provide the institutions with a method for establishing positive identification.

From the foregoing, it can be seen that a need exists for a technique to build a computerized consumer credit reporting system that is capable of requesting, receiving and storing all of the information that is available on a consumer's application for credit, insurance or employment. Such application information may be used for, but not limited to, applying for credit, insurance, or employment, and verifying that the consumer is who he or she portrays themselves to be.

There is a further need for a technique to store the application information in a manner such that the application information is retained and maintained as clearly identifiable. In other words, the integration of some of the application information into the account data of the consumer does not compromise the integrity of the application information itself. The application information remains clearly distinctive and is maintained separate from the account data of the consumer.

Yet another need exists for storing in the database of the consumer reporting agency not only all of the application information, but also an indication of when and what institution submitted the application information.

A further need exists for reducing instances in which persons use the database information to steal the identity of another person. The application information stored in the database is not available to the public in general, except for a consumer requesting his/her own credit report, and even then the consumer must submit substantial detailed information that matches the detailed information stored in the consumer's application information file.

An additional need exists for a technique for automatically comparing the information submitted by a consumer in an application, with the corresponding stored application information to determine inconsistencies therebetween. When a number of inconsistencies result from the comparison, then the transaction may be tagged as one in which an identity of a consumer is attempted to be stolen.

SUMMARY OF THE INVENTION

In accordance with the principles and concepts of the invention, there is disclosed a consumer reporting database for storing application information files in association with account data files, the latter of which includes consumer transaction and experience information. The application information file constitutes an accumulation of records of the application information data that consumers provide in filling out application forms or otherwise convey to institutions. Generally, each application form used by an institution is employed to provide the data for generating an application information record. Multiple application information records are sequentially stored by the consumer reporting agency in the application information file for each consumer, as they are received from the institutions.

In accordance with one embodiment of the invention, institutions periodically request consumer reports, which may be a credit, insurance or employment report, from a consumer reporting agency. In addition to providing information necessary to identify the consumer whose report is requested, the institution is requested to supply most or all of the application information data that the consumer provided in applying for credit, insurance or employment.

In accordance with another feature of the invention, the consumer reporting agency receives the request along with the application information data. The updated consumer identifying information from the application information data is integrated with the account data file of the consumer. The application information data is then stored in a separate record in association with the transaction and experience information of the account file of the consumer.

In accordance with another aspect of the invention, each time an institution transmits application information data associated with a consumer, the consumer reporting agency creates a new application information record with all the application information data provided by the consumer, and adds the new application information record to the consumer's application information file. The application information data of each record is maintained as received and is not depleted or otherwise compromised when some portions thereof are integrated into the transaction and experience information file.

In accordance with yet another feature of the invention, the entire contents of the application information file, or allowable portions thereof, and the transaction and experience information file may, if permitted by regulations, policies and statutes, be forwarded to the institution requesting a report in connection with the respective consumer. In lieu of the transmission of the entire contents or allowable portions of a consumer's application information file, the conclusions of an analysis or a related informational warning may be transmitted to the institution. The informational warning may be of the type which urges the institution to investigate one or more concerns flagged by the analysis.

With regard to yet another feature of the invention, if or when institutions have available the entire application information file, a better determination of the credibility of the consumer information can be made. To that end, a review of the consumer's various application information records can reveal inconsistencies with the information data supplied by the consumer in filling out different application forms with the same or different institutions.

Another feature according to the invention includes a technique that now allows an institution to cross reference the detailed information of the application information records with the statements or application information data then provided by a prospective consumer to determine if identity theft is a possibility.

With all the application information records provided on a particular consumer by the consumer reporting agency to an institution, that institution has a better opportunity to verify the authenticity of information submitted by a person attempting to usurp the identity of a consumer.

In accordance with a further aspect of the invention, the application information data is stored in a separate record, together with additional data that identifies the date and time when the application information data was received by the consumer reporting agency, and also an identity of the institution submitting the consumer's application information data.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1:
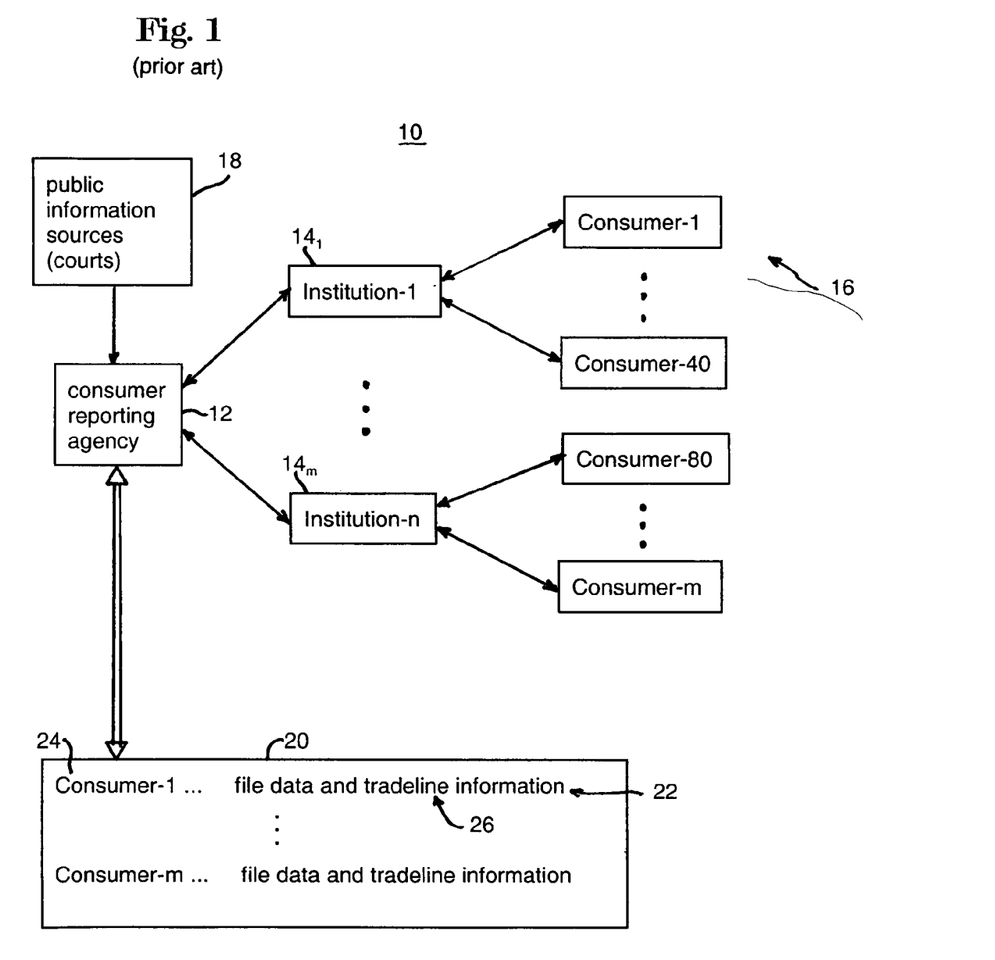
FIG. 1 is a block diagram of the structure of a consumer reporting database of the prior art.

With reference to FIG. 1, there is shown in block diagram form the structure and function of an environment 10 for the operation of a conventional consumer reporting agency 12. The consumer reporting agency 12 can include a number of different types of processors and computers to support thousands of on-line users, such as shown by the institutions $14_1$-$14_m$. An example of the type of consumer reporting agency 12 well adapted for collecting consumer credit information and supplying corresponding consumer reports to on-line users is disclosed in U.S. Pat. No. 6,311,169 by Duhon. Each institution 14 generally provides goods and/or services to its customers, identified by reference numeral 16. The institutions are generally businesses that extend credit to credit-worthy consumers 16. It is recognized that the consumers 16 are the persons or businesses who are purchasing the goods and services of the institutions 14 on credit. Of course, many of the same individuals and businesses are consumers 16 of many of the same institutions 14. As used herein, an institution includes any type of business, whether it be a large business, a small business, a sole proprietorship or any other entity or person having an interest in submitting an application form for some purpose. The terms "person" and "consumer report" are defined as set forth in the Fair Credit Reporting Act, 15 U.S.C. 1681 et. Seq. as enacted at the time of the filing of this application.

It should be understood that while the preferred embodiment of the invention is described in conjunction with the consumer credit reporting industry, the principles and concepts of the invention apply as well to many other industries that involve the use of applications that must be made by the applicant, and the storage of corresponding data concerning the transactions. Such industries include the insurance, employment and other institutions.

Referring back to FIG. 1, the institutions 14 not only request and receive consumer credit reports from the consumer reporting agency 12, but the institutions 14 also contribute information to the consumer reporting agency 12 which facilitates the supplementing and building of the consumer reporting database. To that end, when the institutions 14 request a consumer report from the consumer reporting agency 12, the institutions 14 provide information for identifying the particular consumer 16 of interest. When an account relationship is established with the institution 14, the institution 14 will transmit to the consumer reporting agency 12 trade line information. Trade line information or consumer report information is that information that describes an aspect of the credit history of the consumer 16. For example, if the consumer 16 has made timely payments in connection with an account, that information maybe forwarded by the institution 14 to the credit reporting agency 12. Often, more information is provided than is necessary, and if the supplied information helps to update the present information in the report file of the consumer 16, then such information is used. Otherwise, if portions of the provided information are not useful, such superfluous information is discarded.

An additional source of information for supplementing existing consumer report files, and creating new consumer report files, is information from the court systems 18. This legal information, such as persons or businesses who have declared bankruptcy, have had large judgments levied against them, etc., is useful information that is important in the determination of the creditworthiness of a person, and thus is entered into the reporting file of the person or business.

In addition to a host of other parameters not pertinent to the instant case, the consumer reporting agency 12 is coupled to a consumer reporting database 20, otherwise referred to as an account file. The consumer reporting database 20 includes a respective report file 22 for individuals as well as businesses. Each report file 22 includes an index or identification 24 of the individual or business that is sufficient for finding and selecting the report file 22. In addition, each report file 22 includes trade line information 26 that is unique to that person or business that is useful in determining whether to extend credit to the individual or business. It is a common practice with consumer reporting agencies 12 to receive information data from institutions 14 that appear on the credit applications filled out by the consumers 16. As noted above, the information data is used to supplement an existing consumer file 22 or to create a new consumer file 22. Once this information data is integrated into the existing consumer file 22 or the new consumer file 22, it cannot thereafter be determined where the information data came from, or in certain circumstances when it was integrated into the consumer file 22. While this practice makes the consumer file 22 concise and not repetitive of the same information, there are certain disadvantages. For example, if one credit application is filled out and submitted by the consumer 16 with an indication that the present income is $30,000 annually, and a few days later the same consumer 16 fills out another application listing the annual income as $65,000, there is no way to recognize this ambiguity according to the present data collection and storage techniques.

Figure 2:
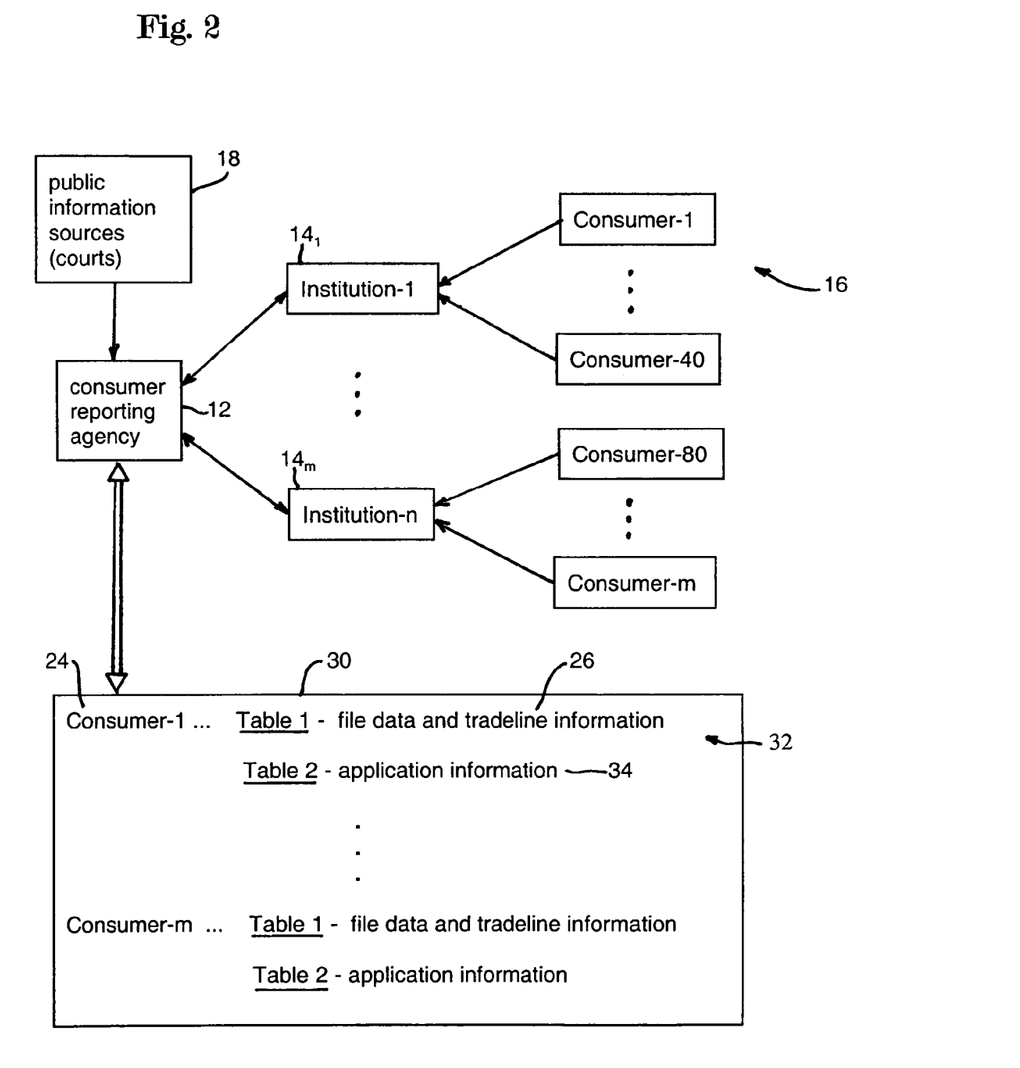
FIG. 2 is a generalized block diagram of a consumer reporting database constructed according to the invention.

FIG. 2 illustrates the consumer reporting database 30 constructed according to one embodiment of the invention. Each consumer file 32 includes identification information 24 unique to the consumer 16, and trade line information 26 much like that described above, except that this information is located in a software table, such as shown as Table 1. There is additionally stored in association with the consumer file 32 a table (Table 2) which includes all or much of the application data provided by the consumer 16 when applying for credit. Preferably, although not by necessity, the Table 2 is provided for the storage of the application information 34. A Table 2 is provided for each consumer for successively storing the application information received from the various institutions 14. Table 2 accumulates the application data from each application in different records, even if such data is repetitive. Indeed, if the application data of specified fields of the various records of application information is repetitive, this may be an indication of the credibility of the information. If the consumer 16 fills out twelve applications in a given period of time, then the corresponding consumer file in Table 2 associated with that consumer will have twelve records, each record containing the full information data contained in the respective application. Those skilled in the art may find that after a long period of time has expired, the records should be deleted or archived. It is contemplated that the records should be maintained available for a period of time greater than ten years.

Figure 3:
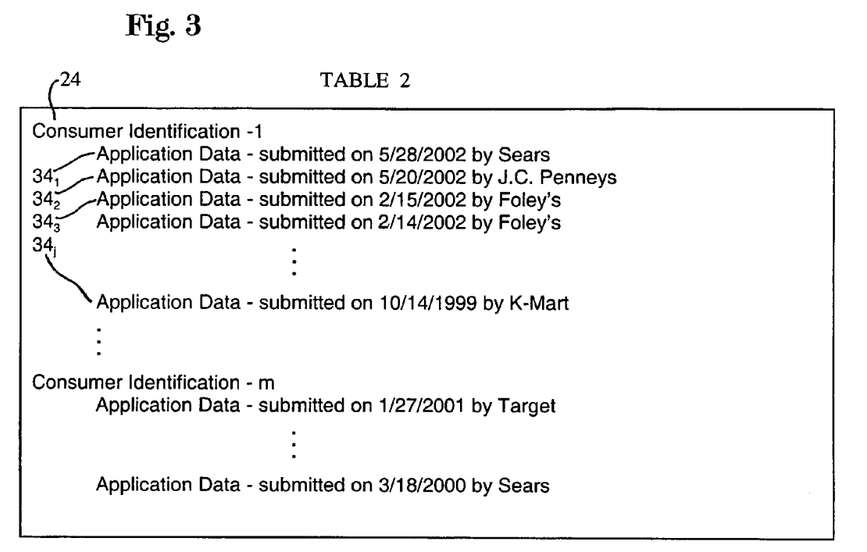
FIG. 3 is a more detailed diagram of the anticipated structure of an application information file of the consumer reporting database of FIG. 2.

FIG. 3 illustrates in more detail an example of the structure of Table 2. Table 2 is shown having an index 24 that is associated with the particular consumer 16. There are a number of records $34_1$-$34_j$, where each record stores a complete set of application information from an application filled out by a consumer 16. The record $34_1$ of Table 2 is shown to be the application information data submitted by the consumer/applicant to obtain credit at a Sears store. Importantly, each record 34 not only contains all the application information data submitted by the institution 14, but also contains the identity of the institution 14 submitting the application information data and the date that the application information data was submitted. The record $34_j$ illustrates the application information stored in connection with a credit application submitted to a K-Mart store. Cross references to the records may be utilized to easily find the application information to a particular consumer 16, rather than have to review each record until the record of interest is found.

Figure 4:
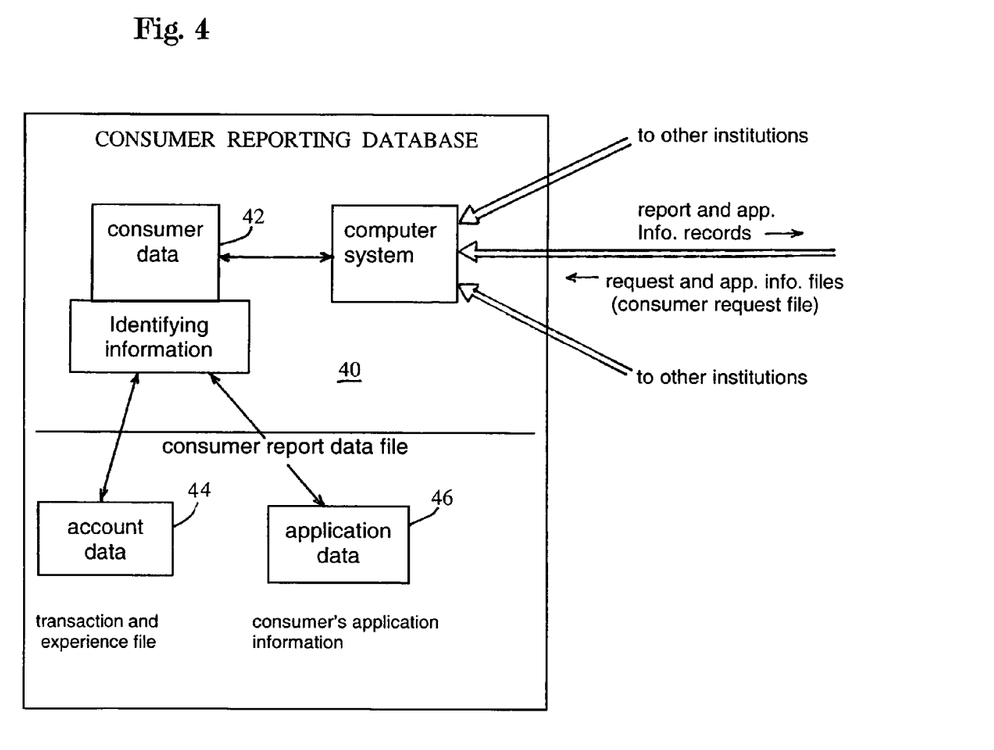
FIG. 4 is another diagram of the interrelationship between the consumer reporting database files according to the invention.

FIG. 4 is another illustration of the consumer reporting database 40 according to an embodiment of the invention. The consumer reporting database 40 stores consumer identifying information 42 unique to the respective consumers 16. When a consumer report is requested by an institution 14, sufficient information must be submitted to identify the particular consumer 16 whose report file is desired. Once the institution 14 has submitted the consumer identifying information, the database 42 uses the same to access the particular records of the account data file 44 to store or retrieve the associated transaction and experience information. The information stored in the account data file 44 is typically ID, financial, trade line and public record information, otherwise known as transaction and experience information, that has been accumulated on the consumer 16 over time by the consumer reporting agency 12. The programming software can be designed to access and provide historical trade line information in the manner described in U.S. Pat. No. 6,311,169 by Duhon, the disclosure of which is incorporated herein by reference.

By utilizing the identifying information stored in the consumer data file 42, the application data file 46 can also be accessed to store or retrieve application information associated with the consumer identifying information. The programming software can be designed to retrieve various fields of each record of the application data file 46, all related records, or the entire contents of the consumer file.

While the preferred embodiment of the invention contemplates the separate storage of the applicant information 46 separate from the account data 44 of each consumer 16, those skilled in the art may find it advantageous to store the account data 44 together with the application data 46 in the same consumer file. It would nevertheless be desirable to store substantially all of the application information and maintain the integrity thereof.

The application information data is preferably submitted by the institution 14 to the consumer reporting agency 12 in a specified format so that the various fields of each application represents the same type of data. For example, a specific field of each application would be submitted by each institution 14 so as to have stored therein the gender of the consumer 16. In this manner, the application information stored in the records can be easily searched to find desired information to construct charts, statistics, etc., of the various parameters of a consumer 16.

The following are examples of application information data that is anticipated to accompany typical applications for credit by consumers having different backgrounds. Insofar as the preferred embodiment of the invention relates to the granting of credit and the storage of consumer credit information, the format for gathering the application information data relates to credit. Those skilled in the art can readily formulate a format for the particular type of information that would be necessary in other consumer reporting situations, such as insurance, employment, etc. The application information data is nevertheless stored in the application data file 46 associated with the respective consumer 16.

The following format for transmitting application information data from an institution 14 to the consumer reporting agency 12 is anticipated to accompany a request for a product, such as a consumer credit report. The format for transmitting the application information data to the consumer reporting agency 12 includes many fields that are not relevant to every consumer situation. To that end, the institution 14 will complete those fields that are applicable to the particular consumer 16, and transmit the same to the consumer reporting agency 12. While the following format is merely an example, it should be understood that the medium or format by which the application information data is transmitted to the consumer reporting agency 12 can be varied to a large degree. The important aspect is that the consumer reporting agency receive the application information data each time a consumer provides personal and financial information to an institution 14 in order to apply for credit.

The electronic data file transmitted by the institution 14 to the consumer reporting agency 12 preferably includes a number of segments. The first few segments of the data file include a header portion which includes an ID for the particular institution 14, and the particular type of product desired, such as a consumer credit report. The next segment includes information that uniquely identifies the consumer 16 associated with the report desired. The consumer information may include the consumer's name, address, employer, date of birth, etc. These first few segments of the data file are typical of the information that has been transmitted to consumer reporting agencies for some time. In accordance with the invention, there are appended to the first few segments of the data file additional segments that contain application information data. It can be realized that the data file transmitted in accordance with the principles of the invention to the consumer reporting agencies 12 is much larger than that heretofore known. The following information segments can be arranged in any order, other than that set forth below.

The next segment in the data file is a Demographic Segment containing twenty eight fields for various types of demographic information of the consumer 16 applying for credit. The demographic segment, as well as the other segments of the data file, is formatted to identify the various fields, and the specific format for the bits in the fields. For example, the first field of the demographic segment relates to the gender of the consumer. This field can be filled in with an alphanumeric (AN) bit. The gender field is eleven bits from the beginning of the segment, and the field is one bit in length. The one-bit gender field can be filled in the alphanumeric designation "F" for the female gender or "M" for the male gender. The second field of the demographic segment starts twelve bits from the beginning of the segment, and can be filled in with one bit of an alphanumeric character to denote the race of the consumer. The other fields of the demographic segment are similarly constructed and are self explanatory. The "N" designation in the various fields means that the fields will accept only numerical characters.

In the populating of the bit positions of the various fields, it is noted that the same segment can be used one or more times in the same transmission of the application information data file. In other words, if more than one loan is involved, the fields of the loan segment would be repeated for each loan. In this manner, all the information available on each loan would be transmitted by the institution 14 to the consumer reporting agency 12. The initial bits (not shown) in each segment identify how many times the segment is repeated. This facilitates the decoding of the data file at the consumer reporting agency 12 and the corresponding storage of the same.

| 1 | Gender | AN | 11 | 1 | No | F = Female M = Male |
|---|---|---|---|---|---|---|
| 2 | Race | AN | 12 | 2 | No | Caucasian African-American Asian |
| 3 | Years of School | N | 14 | 2 | No | Number of years in school. |
| 4 | College Graduate | AN | 16 | 1 | No | Y = Yes N = No |
| 5 | Marital Status | AN | 17 | 1 | No | D = Divorced S = Single M = Married U = Unknown P = Separated W = Widow |
| 6 | Number of Dependents | N | 18 | 2 | No | Number of dependents applicant has. |
| 7 | Age of Dependents | AN | 20 | 24 | No | Ages of dependents delimited by commas. |
| 8 | Relatives Name | AN | 44 | 30 | No | Name of a nearby relative. |
| 9 | Relatives Address | AN | 74 | 70 | No | Address of nearby relative. |

The second segment is a seven field segment for providing address information concerning the consumer 16. This segment is termed the Address Segment.

| 1 | Residence Code | AN | 169 | 1 | No | O = Owns R = Rents P = Parent's |
|---|---|---|---|---|---|---|
| 2 | Number of Years at Residence | N | 170 | 3 | No | Number of years lived at this residence. |
| 3 | Number of Months at Residence | N | 173 | 3 | No | Number of months lived at this residence. |
| 4 | Residence Start Date | Date | 176 | 8 | No | Date started living at this residence. |
| 5 | Residence End Date | Date | 184 | 8 | No | Date stopped living at this residence. |
| 6 | Landlord's Name | AN | 192 | 30 | No | Landlord's name, if rent. |
| 7 | Landlord's Phone Number | N | 222 | 10 | No | Landlord's phone number, if rent. |

The next segment of the application information data file relates to the current employment and income of the consumer 16. This segment is twelve fields in length and is known as the Employment Segment.

| 1 | Employment Start Date | Date | 291 | 8 | No | Consumer's employment start date. Format is MMDDCCYY. |
|---|---|---|---|---|---|---|
| 2 | Employment End Date | Date | 299 | 8 | No | Consumer's employment end date. Format is MMDDCCYY. |
| 3 | Number of Years on the job | N | 307 | 3 | No | Number of years working on this job. |
| 4 | Number of Months on the job | N | 310 | 3 | No | Number of months working on this job. |
| 5 | Profession Start Date | Date | 313 | 8 | No | Consumer's start date in this profession. |

-continued

| | | | | | | |
|---|---|---|---|---|---|---|
| 6 | Number of Years in this profession | N | 321 | 3 | No | Number of years working in this profession. |
| 7 | Number of Months in this profession | N | 324 | 3 | No | Number of months working in this profession |
| 8 | Income | N | 327 | 9 | No | Consumer's income. |
| 9 | Income Frequency | AN | 336 | 1 | No | H = Hourly M = Monthly W = Weekly Y = Yearly |
| 10 | Other Income | N | 337 | 9 | No | Other income received. |
| 11 | Other Income Frequency | AN | 346 | 1 | No | H = Hourly M = Monthly W = Weekly Y = Yearly |
| 12 | Other Income Source | AN | 347 | 30 | No | Description of any other source of income. |

The next segment of application information data file submitted by the institution 14 is a Loan Segment. The loan segment is a twenty-four field segment that provides information concerning the details of the loan desired by the consumer 16.

| | | | | | | |
|---|---|---|---|---|---|---|
| 1 | Account Type Code | AN | 11 | 2 | No | Indicates the reason for this loan. |
| 2 | Loan Amount | N | 13 | 8 | No | Amount of this loan. |
| 3 | Loan Terms | N | 21 | 3 | No | Terms of this loan. |
| 4 | Terms Frequency | AN | 24 | 2 | No | DY = Daily MO = Monthly YR = Yearly |
| 5 | Mortgage Type | AN | 26 | 12 | No | FHA VA Conventional |
| 6 | Interest Rate | N | 38 | 2 | No | Interest rate of this loan. |
| 7 | Amortization Type | AN | 40 | 12 | No | |
| 8 | Source of Down Payment | AN | 52 | 40 | No | Source of the down payment. |
| 9 | Estate Will Be Held In | AN | 92 | 40 | No | Estate will be held in |
| 10 | Construction Loan | AN | 132 | 1 | No | Y = Yes N = No |
| 11 | Year Lot Acquired | Date | 133 | 8 | No | Date lot was acquired. Format is MMDDCCYY. |
| 12 | Original Cost | N | 141 | 12 | No | Original cost |
| 13 | Amount of Existing Liens | N | 153 | 12 | No | Amount of existing liens |
| 14 | Present Lot Value | N | 165 | 12 | No | Present lot value |
| 15 | Cost of Improvements | N | 177 | 12 | No | Cost of improvements |
| 16 | Loan Days | AN | 189 | 5 | No | Loan days |
| 17 | Refinance Loan | N | 194 | 1 | No | Y = Yes N = No |
| 18 | Year Acquired | Date | 195 | 8 | No | Date loan was acquired. Format is MMDDCCYY. |
| 19 | Original Cost | N | 204 | 12 | No | Original cost |
| 20 | Amount of Existing Liens | N | 216 | 12 | No | Amount of existing liens |
| 21 | Purpose of Refinance | AN | 228 | 40 | No | Purpose of refinance |
| 22 | Improvements Made | AN | 268 | 1 | No | Y = Yes N = No |
| 23 | Description of Improvements | AN | 269 | 40 | No | Description of improvements |
| 24 | Cost of Improvements | N | 309 | 12 | No | Cost of improvements |

In the application information data file, the next segment is a Reference Liabilities Segment. This segment is twelve fields in length and requires information listing the references and liabilities of the consumer 16.

| | | | | | | |
|---|---|---|---|---|---|---|
| 1 | Reference Type | AN | 11 | 2 | No | 01 = Installment 07 = Child Support 02 = Revolving 08 = Civil Action 03 = Bank Card 09 = Other 04 = Alimony 10 = Total 05 = Department Store 06 = Job Related Expense |
| 2 | Reference Name | AN | 13 | 30 | No | Reference name of liability |
| 3 | Street Address | AN | 43 | 40 | No | Reference street address |
| 4 | 2nd line of Address | AN | 83 | 40 | No | Reference 2nd line of address |
| 5 | City | AN | 123 | 30 | No | Reference city |
| 6 | State | AN | 153 | 2 | No | Reference state |
| 7 | Zip Code | AN | 155 | 5 | No | Reference ZIP code |
| 8 | Zip + 4 | AN | 160 | 4 | No | Reference ZIP + 4 |
| 9 | Account Number | AN | 164 | 30 | No | Account Number of liability |
| 10 | Amount/Balance of Obligation | N | 194 | 9 | No | Amount/Balance of Obligation |
| 11 | Payment Amount | N | 203 | 9 | No | Monthly payment |
| 12 | Months Remaining | N | 212 | 3 | No | Number of monthly paym'ts left |

The next segment in the information application data file is an Assets Segment. This segment is sixteen fields in length and provides a listing of the various assets of the consumer 16. This segment is repeated for each asset listed on the credit application by the consumer 16.

| | | | | | | |
|---|---|---|---|---|---|---|
| 1 | Reference Type | AN | 11 | 2 | No | 01 = Cash Deposit 02 = Checking 03 = Savings 04 = Checking/Savings 05 = Stocks 06 = Bonds 07 = Stocks/Bonds 08 = Life Insurance 09 = Property 10 = Vested Return 11 = Automobile 12 = Net Worth of Business 13 = Other 14 = Total |
| 2 | Reference Name | AN | 21 | 30 | No | Reference Name of Asset |
| 3 | Street Address | AN | 51 | 40 | No | Reference street address |
| 4 | 2nd line of Address | AN | 91 | 40 | No | Reference 2nd line of address |
| 5 | City | AN | 131 | 30 | No | Reference city |
| 6 | State | AN | 161 | 2 | No | Reference state |
| 7 | Zip Code | AN | 163 | 5 | No | Reference ZIP code |
| 8 | Zip + 4 | AN | 168 | 4 | No | Reference ZIP + 4 |
| 9 | Account Number | AN | 172 | 30 | No | Account Number for reference |
| 10 | Amount/Value of Asset | N | 202 | 9 | No | Amount/Value of Asset. |
| 11 | Date Account Opened | Date | 211 | 8 | No | Date Account Opened for reference |
| 12 | Association Code | AN | 219 | 1 | No | See appendix 6.6.3 |
| 13 | Vehicle Make | AN | 220 | 30 | No | Make of Vehicle |
| 14 | Vehicle Model | AN | 250 | 30 | No | Model of Vehicle |
| 15 | Vehicle Year | N | 280 | 4 | No | Year of Vehicle. Format is CCYY. |
| 16 | Vehicle ID Number | AN | 284 | 30 | No | VIN |

A consumer 16 is required in many applications to provide information concerning housing expense information. The next segment of the application information data file provides such information. The Housing Expense Segment is eighteen fields in length.

| | | | | | | |
|---|---|---|---|---|---|---|
| 1 | Current Rent | N | 11 | 9 | No | Consumer's present rent. |
| 2 | Current Mortgage | N | 20 | 9 | No | Consumer's 1st mortgage including principal and interest. |
| 3 | Current Other Financing | N | 29 | 9 | No | Consumer's additional financing including principal and interest. |
| 4 | Current Hazard Insurance | N | 38 | 9 | No | Consumer's hazard insurance. |

-continued

| | | | | | | |
|---|---|---|---|---|---|---|
| 5 | Current Real Estate Taxes | N | 47 | 9 | No | Consumer's real estate taxes. |
| 6 | Current Mortgage Insurance | N | 56 | 9 | No | Consumer's mortgage insurance. |
| 7 | Current Association Dues | N | 65 | 9 | No | Consumer's homeowner association dues. |
| 8 | Current Other Housing Expenses | N | 74 | 9 | No | Consumer's additional payments. |
| 9 | Total of Current Housing Expenses | N | 83 | 9 | No | Consumer's total present housing expense. |
| 10 | Proposed Rent | N | 92 | 9 | No | Consumer's proposed rent. |
| 11 | Proposed Mortgage | N | 101 | 9 | No | Consumer's proposed 1$^{st}$ mortgage P & I |
| 12 | Proposed Other Financing | N | 110 | 9 | No | Consumer's proposed other financing P & I |
| 13 | Proposed Hazard Insurance | N | 119 | 9 | No | Consumer's proposed hazard insurance. |
| 14 | Proposed Real Estate Taxes | N | 128 | 9 | No | Consumer's proposed real estate taxes. |
| 15 | Proposed Mortgage Insurance | N | 137 | 9 | No | Consumer's proposed mortgage insurance. |
| 16 | Proposed Association Dues | N | 146 | 9 | No | Consumer's proposed homeowner association dues. |
| 17 | Proposed Other Housing Expenses | N | 155 | 9 | No | Consumer's proposed additional payments. |
| 18 | Total of Proposed Housing Expenses | N | 164 | 9 | No | Consumer's total proposed housing expense. |

A Real Estate Owned Segment provides information concerning the real estate owned by the consumer 16. This is a forty-one field segment that provides the details of the identity of the real estate owned by the consumer 16 and the related financial obligations. Again, this segment would be repeated for each separate property owned by the consumer 16.

| | | | | | | |
|---|---|---|---|---|---|---|
| 1 | Property Address 1 | AN | 11 | 40 | No | Property address |
| 2 | Property Address 2 | AN | 51 | 40 | No | Property 2nd line of address |
| 3 | City | AN | 91 | 30 | No | Property city |
| 4 | State | AN | 121 | 2 | No | Property state |
| 5 | Zip Code | AN | 123 | 5 | No | Property ZIP code |
| 6 | Zip + 4 | AN | 128 | 4 | No | Property ZIP + 4 |
| 7 | Market Value | N | 132 | 9 | No | Property market value |
| 8 | Amount of Mortgages & Liens | N | 141 | 9 | No | Total current outstanding of monthly mortgage and liens |
| 9 | Gross Rental Income | N | 150 | 9 | No | Property monthly gross rental income |
| 10 | Mortgage-Rent Payments | N | 159 | 9 | No | Property monthly mortgage-rent payments |
| 11 | Mortgage-Rent Payment Indicator | AN | 168 | 1 | No | M = Mortgage R = Rent |
| 12 | Insurance, Taxes, Maintenance Expense | N | 169 | 9 | No | Total monthly payment for insurance, taxes and maintenance. |
| 13 | Net Rental Income | N | 178 | 9 | No | Net monthly rental income |
| 14 | Rental Property Type | AN | 187 | 1 | No | |
| 15 | Property Purchase Date | Date | 188 | 8 | No | Date when property was purchased. |
| 16 | Title Held Indicator | AN | 196 | 8 | No | Single, Spouse, Other |
| 17 | Lender 1 - Company Name | AN | 204 | 30 | No | Lender's Company Name. |
| 18 | Lender 1 - Address 1 | AN | 234 | 40 | No | Lender 1 street address |
| 19 | Lender 1 - Address 2 | AN | 274 | 40 | No | Lender 1 2nd line of address |
| 20 | Lender 1 - City | AN | 314 | 30 | No | Lender 1 City |
| 21 | Lender 1 - State | AN | 344 | 2 | No | Lender 1 State |
| 22 | Lender 1 - Zip Code | AN | 346 | 5 | No | Lender 1 ZIP Code |
| 23 | Lender 1 - Zip + 4 | AN | 351 | 4 | No | Lender 1 ZIP + 4 |
| 24 | Account Number 1 | AN | 355 | 30 | No | Account Number of property 1 |
| 25 | Lender 2 - Company Name | AN | 385 | 30 | No | Lender Company Name. |
| 26 | Lender 2 - Address 1 | AN | 415 | 40 | No | Lender 2 street address |
| 27 | Lender 2 - Address 2 | AN | 455 | 40 | No | Lender 2 2nd line of address |
| 28 | Lender 2 - City | AN | 495 | 30 | No | Lender 2 City |
| 29 | Lender 2 - State | AN | 525 | 2 | No | Lender 2 State |
| 30 | Lender 2 - Zip Code | AN | 527 | 5 | No | Lender 2 ZIP Code |
| 31 | Lender 2 - Zip + 4 | AN | 532 | 4 | No | Lender 2 ZIP + 4 |
| 32 | Account Number 2 | AN | 536 | 30 | No | Account Number of property 2 |
| 33 | Lender 3 - Company Name | AN | 566 | 30 | No | Lender Company Name. |
| 34 | Lender 3 - Address 1 | AN | 596 | 40 | No | Lender 3 street address. |
| 35 | Lender 3 - Address 2 | AN | 636 | 40 | No | Lender 3 2nd line of address |
| 36 | Lender 3 - City | AN | 676 | 30 | No | Lender 3 City |
| 37 | Lender 3 - State | AN | 706 | 2 | No | Lender 3 State |
| 38 | Lender 3 - Zip Code | AN | 708 | 5 | No | Lender 3 ZIP Code |
| 39 | Lender 3 - Zip + 4 | AN | 713 | 4 | No | Lender 3 ZIP + 4 |
| 40 | Account Number 3 | AN | 717 | 30 | No | Account Number of property 3 |
| 41 | Alternate name used to obtain credit. | AN | 747 | 30 | No | Alternate name used to obtain credit. |

A consumer is often required to provide information concerning judgments levied against him/her. The Declarations Segment of the application information data file provides such information. This segment is fourteen fields in length.

| | | | | | | |
|---|---|---|---|---|---|---|
| 1 | Outstanding Judgments | AN | 11 | 1 | No | Y = Yes N = No |
| 2 | Declared Bankruptcy in last 7 Years | AN | 12 | 1 | No | Y = Yes N = No |
| 3 | Property Foreclosures in last 7 Years | AN | 13 | 1 | No | Y = Yes N = No |
| 4 | Party to a Lawsuit | AN | 14 | 1 | No | Y = Yes N = No |
| 5 | Obliged to a Foreclosed Loan | AN | 15 | 1 | No | Y = Yes N = No |
| 6 | Presently delinquent on other debts | AN | 16 | 1 | No | Y = Yes N = No |
| 7 | Paying Alimony or Child support | AN | 17 | 1 | No | Y = Yes N = No |
| 8 | Any part of the down payment borrowed | AN | 18 | 1 | No | Y = Yes N = No |
| 9 | Presently a co-maker or endorser on a note | AN | 19 | 1 | No | Y = Yes N = No |
| 10 | Property to be occupied as residence | AN | 20 | 1 | No | Y = Yes N = No |
| 11 | US Citizen Indicator | AN | 21 | 1 | No | Y = Yes N = No |
| 12 | Permanent Resident Alien Indicator | AN | 22 | 1 | No | Y = Yes N = No |
| >16 | Ownership in property within the last three years | AN | 23 | 1 | No | Y = Yes N = No |
| 13 | Type of property | AN | 24 | 2 | No | PR = Principal Residence SH = Second Home IP = Investment Property |
| 14 | Title to the home held by | AN | 26 | 2 | No | S = Solely SP = Jointly with Spouse O = Jointly with another person |

Figure 5:
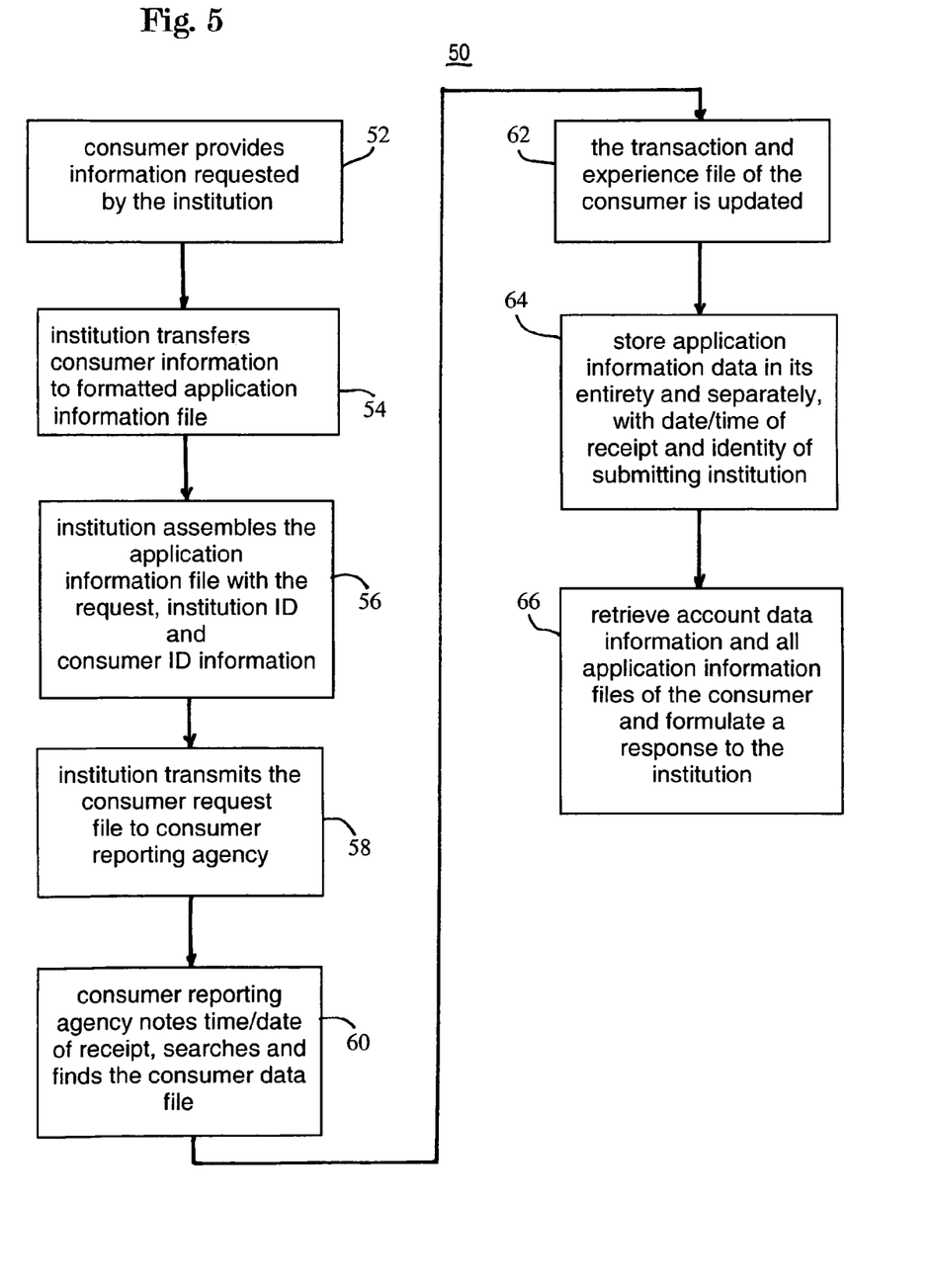
FIG. 5 is a functional flow diagram of the operations carried out by a consumer reporting agency in processing a request by an institution.

FIG. 5 is a flow chart of the general operations 50 of a consumer reporting agency 12 functioning according to the principles and concepts of the invention. In function block 52, there are shown the operations of a consumer 16 who is requested by an institution 14 to fill out a documentary or software form of application, or otherwise verbally provide the necessary information to obtain the goods or services of the institution 14. In function block 54, the institution 14 transfers the consumer information to a formatted application information file, such as set forth above in the appropriate fields of the segments. This can be automatically carried out in the event that the consumer enters the necessary information into a computer itself. Computer terminals at the institution 14 can be programmed to receive the consumer information entered therein and automatically write the information in the appropriate fields of the information application file.

The institution processing center can then receive the application information file of the consumer 16, together with the request and consumer identification information, and assemble the same into a consumer request file. The request would identify the product or services desired of the consumer reporting agency 12. In the case of a consumer credit reporting agency, the product requested would generally be a credit report stored in connection with the consumer 16. This is shown in function block 56. In this process, the institution processing center may automatically insert the ID of the institution 14. This ID is usually an identification code assigned to the institution 14 by the particular consumer reporting agency 12.

In function block 58, the institution 14 transmits the consumer request file electronically to the consumer reporting agency 12. As can be appreciated, there are multiple consumer reporting agencies, and thus the institution would transmit the consumer request file to the appropriate agency 12. The consumer reporting agency 12 receives the consumer request file, as noted by function block 60. Here, the consumer reporting agency 12 notes the date/time of receipt of the consumer request file. The computer of the consumer reporting agency 12 then searches and finds the consumer report data file that matches the consumer identification information contained in the transmitted consumer request file.

Once the consumer's data report file has been found in the database of the consumer reporting agency 12, the transaction and experience file 44 is updated with corresponding new ID information contained in the transmitted consumer request file. This is shown in function block 62.

The consumer reporting agency 12 stores the application information file portion of the consumer 16 request file in the application data file 46. The information provided by the consumer in filling out the application form is stored in the same form as transmitted so as to maintain the integrity thereof. The application information file is stored with other data that identifies the date/time that the consumer request file was received by the consumer reporting agency 12, and the identity of the institution 14 transmitting the consumer request file. This is shown in function block 64. As noted above, the consumer reporting agency 12 stores the new application information file together with the other information files of the consumer previously received and stored in the application data file 46. Each application information file thus received for that consumer 16 from each institution 14 is maintained on record by the consumer reporting agency 12.

Lastly, as shown in function block 66, in order to fulfill the request of the institution 14, the consumer reporting agency 12 retrieves the consumer data from the account file 44 and the application data file 46, processes the same, and formulates a response to the institution 14 requesting the same. The trade line information and other historical information can be displayed in a manner similar to that disclosed in U.S. Pat. No. 6,311,169 by Duhon. The response can utilize a comparison of the newly-submitted data of the consumer 16 with the other application information files of the consumer 16 based on a field-by-field comparison by a computer program. The differences in the respective fields can be displayed to the person at the institution 16 assessing the credit worthiness of the consumer 16.

The accessibility of substantially more consumer information stored in the database of the consumer reporting agency 12 has distinct advantages in providing an improved file integrity for each consumer, and the ability to more readily find the correct file associated with a consumer of interest. In a first instance, with the availability of the application information data, inconsistencies in differentiating different consumers can be more easily resolved. For example, there frequently exist situations where two persons have very similar personal information, and thus when the consumer reporting agency 12 receives the information for one consumer, such information is erroneously written into the file of the other consumer. Such situations can occur when a father and son have the same names, except for the designation "Jr.", "Sr.", "II", etc., and when the father and son live at the same address and have other similar identifiable characteristics. This similarity in personal data makes it difficult to distinguish between the two persons when the only information available is sketchy "wallet information." Wallet information is that information which is easily discernable from the contents of one's wallet. With the availability of separate application information data on file for both the father and the son, such additional information will be useful in resolving more confidently the difference between the two consumers. Accordingly, there will be fewer instances where the file of one consumer is erroneously updated with the data of another consumer.

Secondly, the opposite type of problem can be minimized because of the availability of the application information data of consumers. The second problem that is frequently encountered in the updating of the consumer reporting agency database is that of dealing with "fragmented data." Fragmented data constitutes portions of data concerning the same consumer, but each fragment of data is stored separately in the database as if they were different consumers. In other words, the consumer reporting agency receiving the fragmented data often does not recognize that both portions of the fragmented data should be associated with the same consumer. This can occur when one or both of the consumers identified in each portion of the data have erroneous identifying data, such as where one or more letters of the name are inadvertently transposed, where there is only partial identifying information, etc. Again, this type of error in updating consumer records can be avoided to a large extent with the use of the application information data.

Lastly, with the availability of application information data stored in the database of the consumer reporting agency 12, the agency is better able to identify those instances where a person is attempting to assume the identity of another person, i.e., identity theft. The incidences of identity theft are presently increasing as there are few safeguards against such illegal activity. Because of the general lack of personal information available to the persons or institutions who have a need for the same, the schemes of identity theft are limitless. In a typical scenario of identity theft, a person obtains the "wallet information" from an innocent person. Such information is generally all that is needed for the thief to apply for credit on behalf of the innocent person. Once credit is granted, the thief then runs up a credit bill and does not pay the same. The unpaid status of the credit bill is placed in the credit history of the innocent person. Sometimes, the innocent person is unaware of the theft of the identity until he/she applies for credit and is turned down because of the negative credit report. With the application information data available on the innocent person, the institution requested to extend credit to the thief can query the thief about certain portions of the application information file data to assure that the person requesting credit is actually the person associated with the application information data. To that end, if the thief were asked for information concerning the income, job description, number of dependents, etc., or other similar information, the thief would not generally know such information and the scheme would be revealed.

The utilization of application information data stored in the database 46 of the consumer reporting agency 12 thus provides the capability of finding instances when identity theft is attempted to be carried out. With respect to FIG. 6, there is shown a flow chart of operations 70 for determining when identity theft is possible.

Figure 6:
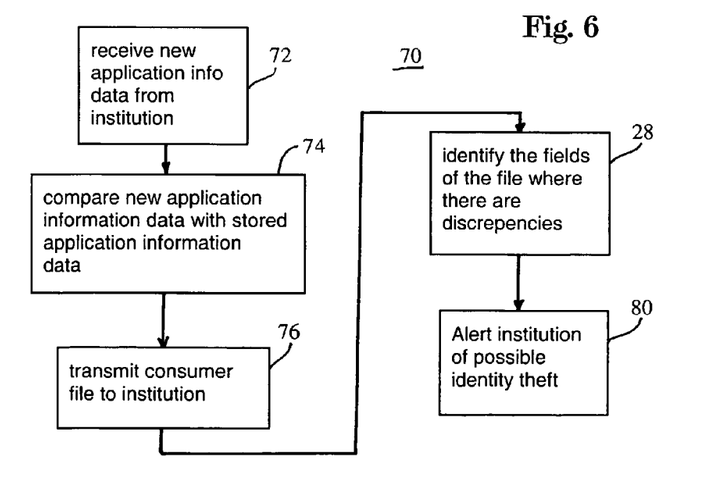
FIG. 6 is a functional flow diagram of a process in comparing the stored application information with new application information data received by the consumer reporting agency to determine if there is identity theft.

In function block 72 of the set of operations 70, the consumer reporting agency 12 receives new application information data from an institution 14. This may be by way of a request for a credit report. The application information data is that information supplied by the consumer/applicant either orally or via a documentary or software application form. The computer system of the consumer reporting agency 12 next matches the identity of the information in the request with the respective consumer's file 46 and retrieves the corresponding application information stored therein. This retrieved information constitutes each record of the consumer/applicant's application information file which is all the information data previously submitted over time by various institutions 14 from the consumer 16.

In function block 74 of the operations, the new application information data is compared, preferably field by field, with the corresponding fields of the stored application information. The consumer's file is then transferred (function block 76) to the institution 14 submitting the request. Importantly, there is also transmitted an indication or listing of the various fields where there are discrepancies between the new application information data and the stored application information. This is shown in function block 78. Lastly, based on the importance and/or number of discrepancies, the consumer reporting agency 12 may provide an alert (function block 80) to the institution 14 of the possibility of identity theft. In response to the alert, and the possibility of a consumer/applicant attempting to steal the identity of a bona fide consumer, the institution 14 can contact the consumer/applicant with follow-up questions or inquiries concerning more detailed information that is contained in the consumer file transferred to the institution 14.

According to another important feature of the invention, the application information files of consumers constitute a vast body of information that is available for internal use by the consumer reporting agency 12 to assist in authenticating the identity of the person related to the report requested. By having on record a greater body of present and historical credit and personal information on consumers, the instances of identity theft and incorrect database matching will be reduced.

From the foregoing, there is disclosed a new technique for storing information related to consumers to facilitate the completeness of data stored and to provide more historical information concerning the details of the consumers. The storage of the application information data of the consumer is accompanied with other data that identifies when the data was received by the consumer reporting agency, and an identity of the person or institution submitting the application information data. The application information, or portions thereof, can be integrated into the transaction and experience information file of the consumer, but the application information data retains its integrity as a whole for use in future retrieval to determine the characteristics of the consumer at that time. The storage of the application information can be advantageously used for comparison with new application information data to ascertain if there is a possibility of the theft of an identity of a consumer on file with the consumer reporting agency.

While the preferred and other embodiments of the invention have been disclosed with reference to a specific database structure and method of operation, it is to be understood that many changes in detail may be made as a matter of software choices without departing from the spirit and scope of the invention, as defined by the appended claims.

What is claimed is:

1. A data processing system adapted for use by a consumer reporting agency to provide consumer credit reports to institutions, said data processing system comprising:

a consumer reporting database controlled by said consumer reporting agency, said consumer reporting database configured to store for each of one or more persons having an identity in said consumer reporting database i) an application information file, and ii) an account data file, wherein said application information file for said each of the one or more persons comprises an accumulation of application information records created from application information data collected by institutions, and said account data file for said each of the one or more persons comprises consumer transaction and experience information;

a computer controlled by said consumer reporting agency, said computer configured to:

electronically receive from an institution a request for a consumer credit report for a consumer, and electronically receive together with said request consumer application information data comprising consumer identification information and all of the financial data of an application form provided by the consumer to the institution when applying for credit;

process the transaction and experience information of the consumer's account data file to produce the consumer's credit report;

correlate the consumer with one of the one or more persons, create a consumer application information record from the received consumer application information data, and store the consumer application information record in the application information file correlated with the one of the one or more persons; and         respond to the request for the consumer credit report by transmitting to the institution the consumer's credit report and all the accumulated application information records of the consumer's application information file for use in determining consumer information credibility through revelation of inconsistencies in the consumer's application information file and for use in determining consumer creditworthiness.

2. The data processing system of claim 1, wherein said computer is further configured to update said consumer reporting database to store the consumer's credit report in association with the consumer's application information file.

3. The data processing system of claim 2, wherein said computer is further configured to control said consumer reporting database to accumulate and to store the application information records so that their respective application information data can be retrieved in the same form as submitted by each institution to said consumer reporting agency.

4. The data processing system of claim 3, wherein said computer is further configured to control said consumer reporting database to separately store said respective application information data so that each different submission can be separately retrieved from the application information file.

5. The data processing system of claim 1, wherein said computer is further configured to control said consumer reporting database to receive each application information record in a specified format.

6. The data processing system of claim 5, wherein said computer is further configured to control said consumer reporting database to automatically accumulate and to store received application information data in respective application information records without human intervention.

7. The data processing system of claim 1, wherein said computer is further configured to control said consumer reporting database to store the consumer application information data together with other data indicating when the consumer application information data was received, and to control said consumer reporting database to store an identity of the institution submitting the consumer application information data.

8. The data processing system of claim 1, wherein said computer is further configured to read and write said consumer reporting database, to compare newly submitted application information data with previously stored application information data, to determine differences therebetween, and to advise the institution of at least some of the differences.

9. The data processing system of claim 1, further including an electronic communication medium, and wherein said consumer reporting agency is accessible by lending institutions via said electronic communication medium, but said consumer reporting agency is not accessible by said lending institutions via an intermediate programmed central processor which distributes the application information data from a vendor to multiple of said lending institutions.

10. A method of storing data by a consumer reporting agency, and providing the stored data in response to requests, comprising:
   maintaining computer-readable files in a consumer reporting database that is controlled by a computer of said consumer reporting agency;
   storing in an account data file of said consumer reporting database transaction and experience information for a consumer having an identity in said consumer reporting database;
   receiving a request from an institution for a consumer credit report for the consumer, and receiving together with the request consumer application information data comprising consumer identification information, all of the financial data of an application form provided by the consumer to the institution when applying for credit and an ID of the institution;
   creating via the computer, a consumer application information record from the received consumer application information data,
   storing in an application information file of said consumer reporting database the consumer application information record, wherein said application information file is associated with the identity of the consumer;
   accumulating in respective application information records of the consumer's application information file application information data received from institutions to which the consumer has applied for credit, each of the respective application information records including an ID of the institution to which the consumer applied for credit; and
   processing said stored transaction and experience information associated with the consumer to produce the consumer's credit report;
   in response to the request for the consumer's credit report transmitting to the institution the consumer's credit report and all of the accumulated application information records of the consumer's application information file for use in determining consumer information credibility through revelation of inconsistencies in the consumer's application information file and for use in determining consumer creditworthiness.

11. The method of claim 10, further including receiving successive application information data associated with the consumer, and sequentially storing the successive application information data in separate application information records, so that all application information data received in a specified period of time for the consumer is stored.

12. The method of claim 11, wherein the specified period of time is greater than ten years.

13. The method of claim 10, wherein the consumer application information data is received in segments, each segment includes a plurality of fields storing different information obtained from the consumer, and each said segment relates to a different area of information concerning the consumer.

14. The method of claim 13, wherein an area of information concerns assets owned by the consumer, and further including receiving by the consumer reporting agency a plurality of asset segments corresponding to said assets owned by the consumer.

15. A consumer credit reporting system comprising:
   a consumer reporting database of a consumer reporting agency, said consumer reporting database storing for a consumer identified in said consumer reporting database an account data file in association with an application information file, wherein said account data file comprises transaction and experience information of the consumer, and wherein said application information file comprises accumulated application information records of the consumer; a computer of the consumer reporting agency configured to:
   electronically receive from an institution a consumer request file, said consumer request file comprising i) a request for a consumer credit report and ii) an application data file, submitted in a specified format, wherein said application data file comprises full application data from an application form provided by the consumer to the institution when applying for credit;
   store said application data file as an application information record in the consumer's application information file together with other stored application information records resulting from other application data files, comprising full application data from other application forms previously submitted in the specified format from institutions, said stored application information record together with said other stored application information records constituting the accumulated application information records of the consumer;
   process said transaction and experience information of the consumer's account data file to produce the consumer's credit report;
   retrieve all of the accumulated application information records of the consumer's application information file; and
   respond to the request for the consumer credit report by transmitting to the institution the consumer's credit report and all of the accumulated application information records for use in determining consumer information credibility through revelation of inconsistencies in the consumer's application information records and for use in determining consumer creditworthiness.

16. The consumer credit reporting system of claim 15, wherein said computer is further configured to compare said received application data file to said other application data files, to determine differences therebetween and to advise the institution of at least some of the differences.

17. A method of storing data by a consumer reporting agency and providing the stored data in response to requests, comprising:

maintaining, in a consumer reporting database of a consumer reporting agency, an account data file in association with an application information file for a consumer identified in said consumer reporting database, wherein said account data file comprises transaction and experience information of the consumer, and wherein said application information file comprises accumulated application information records of the consumer;

electronically receiving, via a computer of the consumer reporting agency, from an institution a consumer request file, said consumer request file comprising i) request for a consumer credit report and ii) an application data file, submitted in a specified format, wherein said application data file comprises full application data from an application form provided by the consumer to the institution when applying for credit;

storing, via the computer, said application data file as an application information record in the consumer's application information file together with other stored application information record resulting from other application data files, comprising full application data from other application forms previously submitted in the specified format from institutions, said stored application information record together with said other stored application information records constituting the accumulated application information records of the consumer;

processing, via the computer, said transaction and experience information of the consumer's account data file to produce the consumer's credit report;

retrieving, via the computer, all of the accumulated application information records of the consumer's application information file; and transmitting, via the computer, to the institution the consumer's credit report and all of the accumulated application information records for use in determining consumer information credibility through revelation of inconsistencies in the consumer's application information records and for use in determining consumer creditworthiness.

18. The method of claim 17, wherein said storing further comprises storing the received application data file together with an identity of the institution from which the consumer request file was received.

* * * * *